United States Patent
Choi et al.

(10) Patent No.: US 9,215,567 B2
(45) Date of Patent: Dec. 15, 2015

(54) LOCAL AREA BROADCASTING SERVICE SYSTEM AND METHOD, AND WIRELESS TRANSMISSION DEVICE APPLIED THEREIN

(75) Inventors: Keun Hwan Choi, Seoul (KR); Moon Kee Kim, Yongin-si (KR); Cheol Ho Yim, Daejeon (KR); Kyung Sik Han, Yongin-si (KR); Jae Yeon Noh, Seongnam-si (KR); Jae Hwang Yu, Seoul (KR); Min Seok Kim, Seoul (KR); Sun Joon In, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1155 days.

(21) Appl. No.: 13/202,074

(22) PCT Filed: Oct. 29, 2009

(86) PCT No.: PCT/KR2009/006291
§ 371 (c)(1),
(2), (4) Date: Sep. 28, 2011

(87) PCT Pub. No.: WO2010/095800
PCT Pub. Date: Aug. 26, 2010

(65) Prior Publication Data
US 2012/0026999 A1    Feb. 2, 2012

(30) Foreign Application Priority Data

Feb. 17, 2009  (KR) .......... 10-2009-0012779
Jul. 23, 2009  (KR) .......... 10-2009-0067391

(51) Int. Cl.
*H04W 4/06*   (2009.01)
*H04L 1/00*   (2006.01)
*H04L 12/18*  (2006.01)
*H04H 20/71*  (2008.01)

(52) U.S. Cl.
CPC ............. *H04W 4/06* (2013.01); *H04H 20/71* (2013.01); *H04L 1/004* (2013.01); *H04L 12/189* (2013.01); *H04L 12/1886* (2013.01)

(58) Field of Classification Search
None
See application file for complete search history.

(56) References Cited

U.S. PATENT DOCUMENTS

2001/0053700 A1   12/2001  Sibley
2002/0059624 A1*  5/2002   Machida et al. ............... 725/91

(Continued)

FOREIGN PATENT DOCUMENTS

KR   10-2006-0063886   6/2006
WO   2004/068877       8/2004

OTHER PUBLICATIONS

International Search Report mailed Jun. 22, 2010 for PCT application No. PCT/KR2009/006291, citing the above reference(s).

*Primary Examiner* — Ashley Shivers
(74) *Attorney, Agent, or Firm* — Hauptman Ham, LLP

(57) ABSTRACT

Provided is a system and method for a local area broadcast service, and a wireless transmission apparatus applied to them. In the system, contents to be broadcasted in a predetermined local area are transmitted from a broadcast server to a wireless transmission apparatus through a wired network based on an Internet Protocol and the contents are then broadcasted from the wireless transmission apparatus to one or more user terminal devices. Therefore, according to the present invention, a server of a wired network can easily provide particular contents for each particular local area to one or more user terminal devices in the local area. Moreover, it is possible to reduce the load of the server, when the server provides multiple types of contents or provides contents to a plurality of user terminal devices.

17 Claims, 13 Drawing Sheets

(56) References Cited

U.S. PATENT DOCUMENTS

| | | |
|---|---|---|
| 2005/0160345 A1 | 7/2005 | Walsh et al. |
| 2005/0177638 A1* | 8/2005 | Oh .............................. 709/227 |
| 2007/0040818 A1* | 2/2007 | Aoyanagi et al. ............. 345/204 |
| 2009/0196165 A1* | 8/2009 | Morimoto et al. ............ 370/208 |
| 2009/0285096 A1* | 11/2009 | Yousef .......................... 370/235 |
| 2010/0085922 A1* | 4/2010 | Dhanapal et al. ............. 370/329 |

\* cited by examiner

LOCAL AREA BROADCASTING SERVICE SYSTEM AND METHOD, AND WIRELESS TRANSMISSION DEVICE APPLIED THEREIN

CROSS REFERENCE TO RELATED APPLICATION

This application claims the priority of Korean Patent Application No. 10-2009-0012779, filed on Feb. 17, 2009, and Korean Patent Application No. 10-2009-0067391, filed on Jul. 23, 2009 in the KIPO (Korean Intellectual Property Office), the disclosure of which is incorporated herein in their entirety by reference. Further, this application is the National Phase application of International Application No. PCT/KR2009/006291, filed Oct. 29, 2009, which designates the United States and was published in Korean. Each of these applications is hereby incorporated by reference in their entirety into the present application.

TECHNICAL FIELD

The present invention relates to a digital broadcast channel structure establishing scheme, and more particularly to a system and method for a local area broadcast service, a wireless transmission apparatus applied to them, and a protocol stack structure for providing the local area broadcast service, in which contents are transmitted through a local area communication network by applying a broadcast type unidirectional transmission scheme.

BACKGROUND ART

Recently, various types of services are being provided using networks for a local area communication, such as a Wireless Personal Area Network (WPAN) and a Wireless Local Area Network (WLAN). For example, there is a service by which multimedia contents or a coupon can be transmitted to a terminal of a vehicle in a parking lot, which is being refueled, by using a Bluetooth. In order to use such a wireless service, an authentication process and a connection process between an access point (transmitter side device) for transmitting the contents or coupon and an end device (receiver side device) for receiving the contents or coupon are necessary.

Most of the existing WPAN/WLAN based transmission schemes correspond to connection based transmission schemes and to connection schemes replacing wire by wireless. That is, when there is a request for connection from a transmitter side, a process of approval for the request is first performed and data is then transmitted. Further, even after the connection is established, and after the data is transmitted, additional data is sent only when there has been an acknowledgement of data reception from the receiver side.

Since the connection based transmission schemes as described above require a process of acknowledgement of data reception, it is possible to achieve a reliable data transmission. However, the connection based transmission schemes are problematic in that they require time consumption for the process of acknowledgement, an additional process for the connection, management of each connection, etc.

DISCLOSURE

Technical Problem

Therefore, the present invention has been made in view of the above-mentioned problems, and an object of the present invention is to provide a system and method for a local area broadcast service, and a wireless transmission apparatus applied to them, in which data is transmitted according to a broadcast type unidirectional transmission scheme instead of the existing connection based contents transmission scheme, so as to solve the problems due to the authentication process, the connection process, and the limit in the number of connections to be used for transmission.

Technical Solution

In accordance with an aspect of the present invention, there is provided a system having a protocol stack structure for providing a local area broadcast service, the system including: a broadcast server for forming contents based on a broadcast transmission protocol and a broadcast transmission conversion protocol and transmitting the contents through a transmission protocol of a wired network; a wireless transmission apparatus for broadcasting the contents, which have been received through the transmission protocol of the wired network, to a corresponding local area in a form of the broadcast transmission conversion protocol; and one or more user terminal devices for receiving the contents through the broadcast transmission conversion protocol, the user terminal devices being located in the local area.

It is preferred that the broadcast server multiplexes the contents through the broadcast transmission conversion protocol when the contents correspond to a moving picture.

It is also preferred that the broadcast server converts the contents according to a carousel scheme through the broadcast transmission conversion protocol when the contents correspond to a file.

In accordance with another aspect of the present invention, there is provided a broadcast server of a system having a protocol stack structure for providing a local area broadcast service, the broadcast server including: an application program stack for forming contents to be broadcasted; a broadcast transmission conversion protocol stack for setting the formed contents according to a broadcast format for broadcasting the contents to a local area; a broadcast transmission protocol stack for setting the transmission of the contents through a transmission path in a wired network; an Internet Protocol (IP) stack for identifying an IP address of an access point corresponding to the local area; a Media Access Control (MAC) stack for identifying a MAC address of the access point based on the IP address; and a physical stack connected to a wired network to transmit the contents to the identified MAC address as a destination.

It is preferred that the broadcast server further includes a Real Time Protocol (RTP) stack in order to transmit the contents in real time.

It is also preferred that the broadcast transmission conversion protocol stack supports MPEG2-TS (Moving Pictures Experts Groups 2-Transport Stream).

It is also preferred that the broadcast transmission protocol stack is based on a User Datagram Protocol (UDP).

In accordance with another aspect of the present invention, there is provided a wireless transmission apparatus for providing a local area broadcast service, the wireless transmission apparatus including: an Internet Protocol (IP) network module connected with an IP based wired network to receive contents to be broadcasted; and a local area wireless network module for broadcasting the received contents to a corresponding local area, wherein the IP network module includes: a physical stack to be connected with the wired network; a media access control stack having a media access control address for receiving the contents; an Internet protocol stack having an IP address allocated to the media access control address corresponding to the local area; and a first broadcast transmission protocol stack for determining the contents and determining to receive the contents.

It is preferred that the first broadcast transmission protocol stack transfers the contents in a form of the broadcast transmission conversion protocol to the local area wireless network module.

It is also preferred that the first broadcast transmission protocol stack is based on a User Datagram Protocol (UDP).

It is also preferred that the local area wireless network module includes: a second broadcast transmission protocol stack for receiving contents in a form of the broadcast transmission conversion protocol; a coding stack for encoding the contents according to a format for broadcasting the contents; a local area communication based media access control stack for setting the local area as a target for broadcasting of the contents; and a local area communication based physical stack for broadcasting the contents to the local area through a local area wireless communication.

It is also preferred that the second broadcast transmission protocol stack is based on a User Datagram Protocol (UDP).

It is also preferred that the coding stack is based on a Protocol Adaptive Layer (PAL).

It is also preferred that the broadcast transmission conversion protocol stack supports MPEG2-TS (Moving Pictures Experts Groups 2-Transport Stream).

In accordance with another aspect of the present invention, there is provided a wireless transmission apparatus for providing a local area broadcast service, the wireless transmission apparatus including: a server connection unit for forming a connection network with the wireless transmission apparatus, which is remotely located, through a wired or wireless network; a broadcast data generator for converting the contents received through the server connection unit to a digital broadcast signal corresponding to unidirectional transmission type data; and a terminal connection unit for broadcasting the digital broadcast signal to one or more user terminal devices through a local area wireless communication network.

It is also preferred that the coding stack is based on a Protocol Adaptive Layer (PAL).

It is also preferred that the broadcast transmission conversion protocol stack supports MPEG2-TS (Moving Pictures Experts Groups 2-Transport Stream).

In accordance with another aspect of the present invention, there is provided a method for providing a local area broadcast service, the method including the steps of: forming/setting contents to be broadcasted, by a broadcast server, based on a broadcast transmission protocol and a broadcast transmission conversion protocol; transmitting the contents through a transmission protocol of a wired network; determining whether to broadcast the contents received according to the transmission protocol of the wired network and broadcasting the contents to a corresponding local area in a form of the broadcast transmission conversion protocol by a wireless transmission apparatus connected to the wired network; and receiving the contents through the broadcast transmission conversion protocol by a user terminal device located in the local area.

It is also preferred that the step of forming/setting the contents includes the steps of: forming the contents by an application program stack; and setting the formed contents according to a broadcast format for broadcasting the contents to a local area by a broadcast transmission conversion protocol stack.

It is also preferred that the step of transmitting the contents includes the steps of: setting transmission of the contents through a transmission path in a wired network by a broadcast transmission protocol stack; identifying an IP address of the wireless transmission apparatus by an Internet Protocol (IP) stack; identifying a MAC address of the access point based on the IP address by a Media Access Control (MAC) stack; and transmitting the contents to the wireless transmission apparatus based on the identified MAC address by a physical stack connected to the wired network.

It is also preferred that the step of broadcasting the contents includes the steps of: executing an Internet Protocol (IP) network module connected with the wired network to receive the contents from the broadcast server; and executing a local area wireless network module to broadcast the received contents to a corresponding local area.

It is also preferred that the step of executing the IP network module includes the steps of: connecting a physical stack with the wired network; executing a media access control stack having a media access control address for receiving the contents; executing an Internet protocol stack having an IP address allocated to the media access control address corresponding to the local area; and executing a first broadcast transmission protocol stack for determining the contents and determining to receive the contents.

It is also preferred that the step of executing the first broadcast transmission protocol stack includes the step of: when the contents are received based on a User Datagram Protocol (UDP), the first broadcast transmission protocol stack determines whether the contents correspond to contents to be broadcasted corresponding to the local area.

It is also preferred that the step of executing the local area wireless network module includes the steps of: executing a second broadcast transmission protocol stack for receiving contents in a form of the broadcast transmission conversion protocol from the IP network module; encoding the contents according to a format for broadcasting the contents by a coding stack; executing a local area communication based media access control stack for setting the local area as an object for broadcasting of the contents; and executing a local area communication based physical stack for broadcasting the contents to the local area through a local area wireless communication.

In accordance with another aspect of the present invention, there is provided a user terminal device located within a local area to provide a local area broadcast service, the user terminal device including: a local area wireless communication based physical stack for connection to a local area wireless network in the local area; a local area wireless communication based media access control stack having a media access control address for receiving contents broadcasted through the local area wireless network; a coding stack for encoding the contents according to a format for broadcasting the contents; and an application program stack for outputting the contents in a form of a broadcast transmission conversion protocol.

It is also preferred that the broadcast data generator includes: a signal generation module for generating a pilot channel and a broadcast channel corresponding to the contents; a multiplexer module for multiplexing the pilot channel and the broadcast channel; and an error correction encoding module for performing a Forward Error Correction (FEC) of a signal output from the multiplexer module so as to output an encoded digital broadcast signal.

It is also preferred that the terminal connection unit broadcasts the converted digital broadcast signal through a physical layer of the local area communication network.

In accordance with another aspect of the present invention, there is provided a user terminal device for providing a local area broadcast service, the user terminal device including: a data storage unit for storing contents; a broadcast data generator for converting the stored contents to a digital broadcast signal, which corresponds to unidirectional transmission type data; and a communication support unit for receiving the digital broadcast signal from an adjacent user terminal device and broadcasting the converted digital broadcast signal to an adjacent user terminal device through a local area wireless communication network.

It is also preferred that the broadcast data generator includes: a signal generation module for generating a pilot channel and a broadcast channel corresponding to the contents; a multiplexer module for multiplexing the pilot channel and the broadcast channel; and an error correction encoding module for performing a Forward Error Correction (FEC) of a signal output from the multiplexer module so as to output an encoded digital broadcast signal.

It is also preferred that the communication support unit broadcasts the converted digital broadcast signal through a physical layer of the local area communication network.

In accordance with another aspect of the present invention, there is provided a method for providing a local area broadcast service, the method including the steps of: providing contents through a wired or wireless network by a wireless transmission apparatus; converting the contents received through the wired or wireless network to a digital broadcast signal corresponding to unidirectional transmission type data; and broadcasting the digital broadcast signal to one or more adjacent user terminal devices through a physical layer of a local area wireless communication network.

In accordance with another aspect of the present invention, there is provided a method for providing a local area broadcast service for contents, which are previously stored or received form a remotely located wireless transmission apparatus, the method including the steps of: generating a pilot channel and a broadcast channel corresponding to the contents; multiplexing the pilot channel and the broadcast channel; performing a Forward Error Correction (FEC) of the multiplexed signal so as to output an encoded digital broadcast signal; and broadcasting the digital broadcast signal to one or more user terminal devices through a local area wireless communication network.

It is also preferred that, in the step of broadcasting the digital broadcast signal, the digital broadcast signal is broadcasted through a physical layer of the local area wireless communication network.

In accordance with another aspect of the present invention, there is provided a method for providing a local area broadcast service for contents, which are previously stored or received form a remotely located wireless transmission apparatus, the method including the step of: broadcasting the contents to one or more adjacent user terminal devices through a physical layer of a local area wireless communication network.

It is also preferred that the method further includes the step of performing a Forward Error Correction (FEC) of the contents so as to output an encoded digital broadcast signal, before the step of broadcasting the contents.

Advantageous Effects

The present invention provides a protocol stack structure, in which contents to be broadcasted in a predetermined local area are transmitted from a broadcast server to a wireless transmission apparatus through a wired network based on an Internet Protocol and the contents are then broadcasted from the wireless transmission apparatus to one or more user terminal devices. Therefore, according to the present invention, a server of a wired network can easily provide particular contents for each particular local area to one or more user terminal devices in the local area. Moreover, it is possible to reduce the load of the server, when the server provides multiple types of contents or provides contents to a plurality of user terminal devices.

Further, since the present invention employs a broadcast type unidirectional transmission scheme to broadcast the contents through a local area wireless communication network, the present invention can reduce the long access time due to the existing connection based contents transmission scheme and can provide contents to a limitless number of terminals.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, a system having a protocol stack structure for broadcasting within a local area according to an exemplary embodiment of the present invention will be described with reference to the accompanying drawings.

Figure 1:
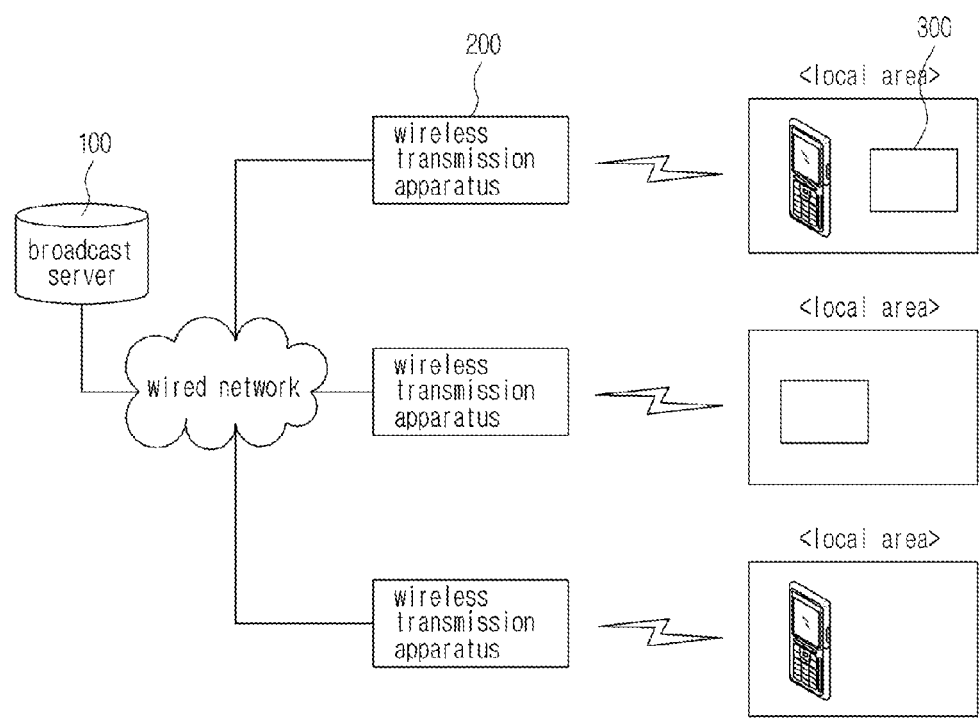
FIG. 1 is a block diagram illustrating a system having a protocol stack structure for broadcasting within a local area according to an exemplary embodiment of the present invention.

FIG. 1 is a block diagram illustrating a system having a protocol stack structure for broadcasting within a local area according to an exemplary embodiment of the present invention. As shown just as an example in FIG. 1, a system having a protocol stack structure for broadcasting within a local area according to an exemplary embodiment of the present invention includes a broadcast server 100 for providing contents to be broadcasted, a plurality of wireless transmission apparatuses 200, each of which serves as an Access Point (AP) connected with the broadcast server 100 through a wired network (e.g. Internet), and one or more user terminal devices 300 located within local areas corresponding to the wireless transmission apparatuses 200, respectively.

The broadcast server 100 forms contents specific to each particular local area and then establishes settings for broadcasting contents corresponding to relevant local area.

The contents formed and set as described above are transmitted to the wireless transmission apparatuses 200 through a wired network (e.g. Internet). Then, one of the wireless transmission apparatuses 200 receiving the contents identifies that the received contents are contents that can be broadcasted to a corresponding local area, and broadcasts (i.e. unidirectional transmission) the contents according to a local area wireless scheme.

According to another scheme, the broadcast server 100 may specify a destination to receive the contents, make a transmission setting through a wired network, and transmit the contents to the destination. Then, a wireless transmission apparatus 200 corresponding to the destination may receive the contents and execute the broadcasting to a corresponding local area.

Further, there is no connection of communication between a wireless transmission apparatus 200 and at least one corresponding user terminal device 300 located in a local area. Instead, the user terminal device 300 receives contents broadcasted according to a local area communication scheme by the wireless transmission apparatus 200. Therefore, even when multiple user terminal devices 300 are located within a local area and receive contents from the wireless transmission apparatus 200, there is no load applied to the broadcast server 100 and the wireless transmission apparatus 200.

Figure 2:
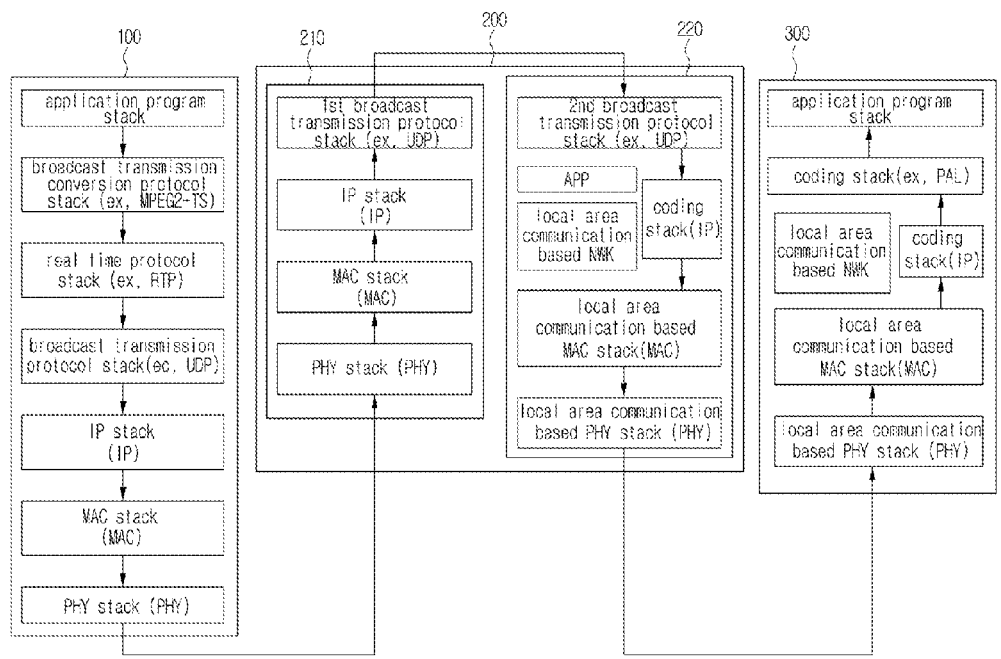
FIG. 2 illustrates a protocol stack structure for configuring the system shown in FIG. 1.

FIG. 2 illustrates a protocol stack structure for configuring the system shown in FIG. 1. As shown in FIG. 2, the protocol stack structure for configuring the system according to the present invention has an interconnection structure between a broadcast server 100, a plurality of wireless transmission apparatuses 200 connected with the broadcast server 100 through a wired network (e.g. Internet), and one or more user terminal devices 300, each of which is located within a local area, to receive contents broadcasted according to a local area communication scheme from a corresponding wireless transmission apparatus 200.

The broadcast server 100 includes an application program stack for forming contents to be broadcasted, a broadcast transmission conversion protocol stack for setting the formed contents according to a broadcast format for transferring the contents to the user terminal device 300 within a corresponding local area in a broadcast transmission scheme, a broadcast transmission protocol stack for setting the transmission of the contents through a transmission path in a wired network (e.g. Internet), an Internet Protocol (IP) stack for identifying an IP address of the wireless transmission apparatus 200 corresponding to the local area for broadcasting the contents, a Media Access Control (MAC) stack for identifying a MAC address of the wireless transmission apparatus 200 based on the IP address, and a physical stack for transmitting the contents through a wired network based on the identified MAC address.

It is preferred that the broadcast server 100 may further include a Real Time Protocol (RTP) stack in order to transmit the contents in real time.

Further, in the process of converting the contents into contents of a broadcast format, it is necessary to execute multiplexing (MUXing) of the contents through the broadcast transmission conversion protocol stack when the contents correspond to moving pictures, and it is required to convert the contents according to the carousel scheme through the broadcast transmission conversion protocol stack when the contents correspond to files.

The carousel scheme corresponds to a scheme for enabling a user to optionally select between file type contents after the file type contents are transferred to the user terminal device 300, and refers to a scheme of classifying the contents as static data.

The broadcast transmission conversion protocol stack may be implemented in the form of MPEG2-TS (Moving Pictures Experts Groups 2-Transport Stream) and can be replaced by another scheme.

Further, the broadcast transmission protocol stack may be implemented either by a scheme of distributing the contents on a wired network based on a User Datagram Protocol (UDP) or by a scheme of transferring the contents to a particular IP address based on a Transmission Control Protocol (TCP).

The wireless transmission apparatus 200, which serves as an Access Point (AP), includes an Internet Protocol (IP) network module 210 connected with an IP based wired network to receive contents to be broadcasted, and a local area wireless network module 220 for broadcasting the received contents to a corresponding local area according to a local area wireless communication scheme.

The IP network module 210 includes a physical stack to be connected with a wired network, a media access control stack including a media access control address indicating a destination to receive the contents from the wired network, an Internet protocol stack including an IP address allocated to the media access control address, and a first broadcast transmission protocol stack for determining if contents received according to a UDP scheme are the object to be broadcasted, and determining to receive the contents.

In addition, it is preferred that the IP network module 210 further includes a Real Time Protocol (RTP) stack when the IP network module 210 receives the contents from the broadcast server 100 in real time.

Further, it is preferred that the first broadcast transmission protocol stack is based on the UDP.

Therefore, the IP network module 210 analyzes the first broadcast transmission protocol stack and then transfers the contents in the form of broadcast transmission protocol stack (e.g. MPEG2-TS; Moving Pictures Experts Groups 2-Transport Stream) to the local area wireless network module 220.

The local area wireless network module 220 includes a second broadcast transmission protocol stack for receiving contents in the form of broadcast transmission conversion protocol, a coding stack for encoding the contents according to a format for broadcasting the contents to a local area, a local area communication based media access control stack for setting the local area as an object for broadcasting of the contents, and a local area communication based physical stack for broadcasting the contents to a local area through a local area wireless communication.

It is preferred that the second broadcast transmission protocol stack is based on the UDP.

The coding stack is based on a Protocol Adaptive Layer (PAL) and adapts the contents to a protocol for execution of the broadcasting.

Further, at least one user terminal device 300 located in the local area includes: a physical stack for connection to a local area wireless network broadcasting contents according to a local area wireless communication scheme; a local area wireless communication based media access control stack having a media access control address for receiving contents broadcasted according to a local area wireless communication scheme; a coding stack for encoding contents into a format for displaying the contents on a display screen of the terminal in a broadcasted form; and an application program stack for outputting contents in the form of a broadcast transmission conversion protocol.

It is preferred that the coding stack performs the coding of the contents based on a Protocol Adaptive Layer (PAL), and the broadcast transmission conversion protocol may have the form of MPEG2-TS (Moving Pictures Experts Groups 2-Transport Stream).

Figure 3:
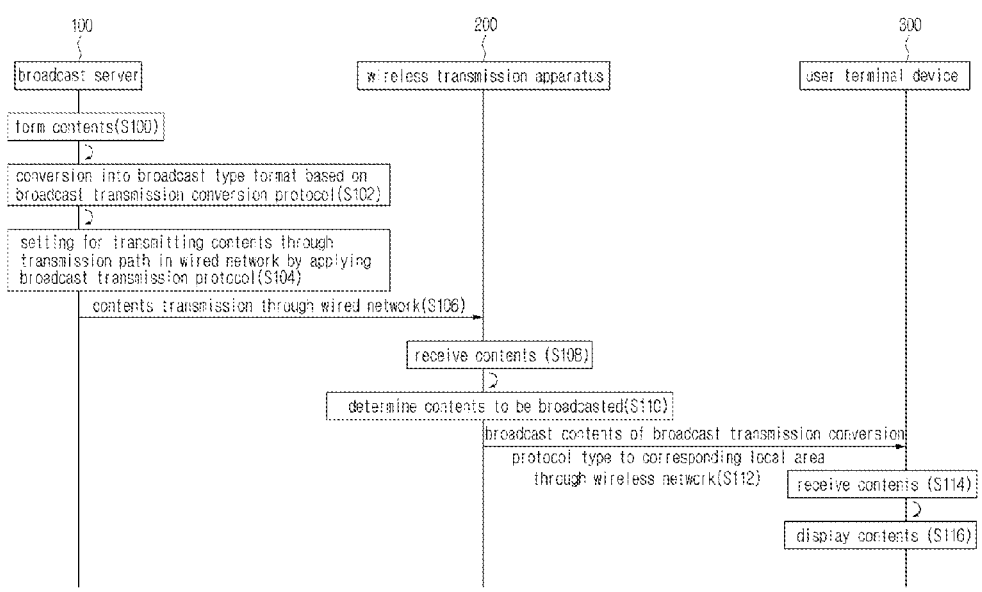
FIG. 3 is a flow diagram illustrating the operation process of a system having a protocol stack structure for broadcasting within a local area as shown in FIG. 1.

FIG. 3 is a flow diagram illustrating the operation process of a system having a protocol stack structure for broadcasting within a local area as shown in FIG. 1. As shown as a simple example in FIG. 3, with a protocol stack structure for broadcasting within a local area, the broadcast server 100 first forms contents to be broadcasted in a predetermined local area (step S100).

Then, the broadcast server 100 converts the contents into contents of a format for broadcasting the contents to a local area based on a broadcast transmission conversion protocol (step S102).

Further, the broadcast server 100 performs setting for transmitting contents through a transmission path in a wired network (e.g. Internet) by applying a broadcast transmission protocol (e.g. UDP) (step S104).

The contents formed and set as described above are transferred to the wireless transmission apparatus 200 through a wired network (e.g. Internet) (step S106).

Then, the wireless transmission apparatus 200 receives the contents (step S108) and then determines if the received contents are contents to be broadcasted to a corresponding local area (step S110).

It is preferred that step S110 is performed when the contents are transmitted based on the UDP.

Thereafter, when the received contents are the contents to be broadcasted, the wireless transmission apparatus 200 broadcasts the contents to a corresponding local area in the form of broadcast transmission conversion protocol (step S112).

Then, at least one user terminal device 300 located in a local area receives the contents broadcasted to the local area according to a local area wireless communication scheme and displays the contents on a display screen of the terminal (steps S114 and S116).

Figure 4:
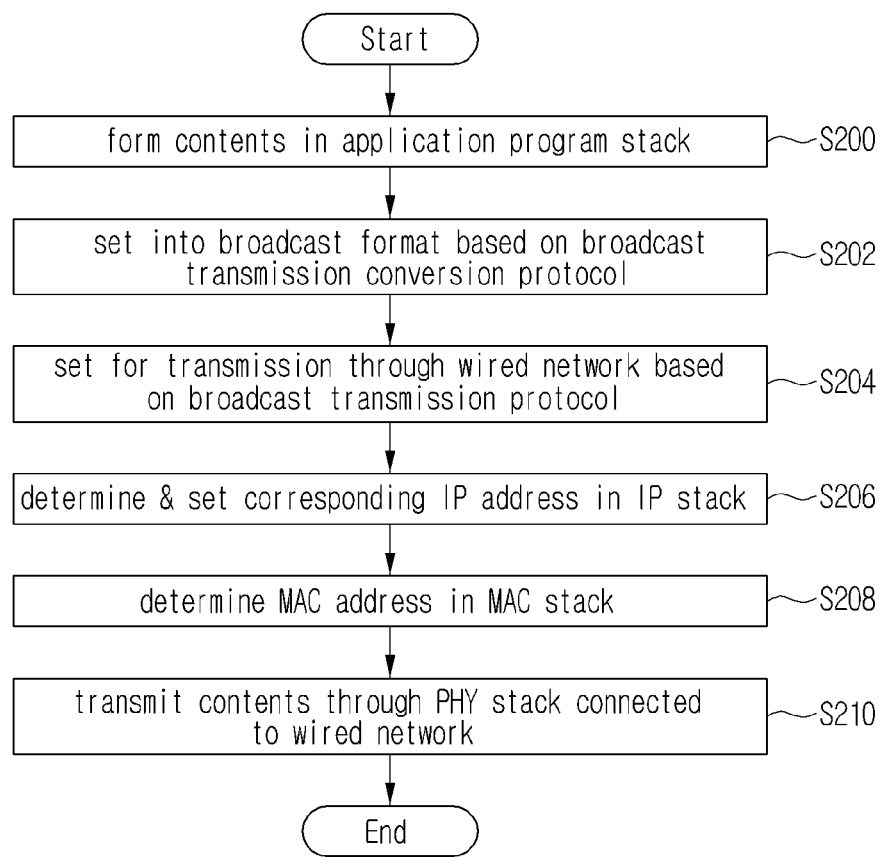
FIG. 4 is a flowchart illustrating the operation process of the broadcast server 100 during the operation shown in FIG. 3.

FIG. 4 is a flowchart illustrating the operation process of the broadcast server 100 during the operation shown in FIG. 3. As shown as a simple example in FIG. 4, the broadcast server 100 first forms contents to be broadcasted to a predetermined local area in an application program stack (step S200).

Thereafter, the broadcast server 100 converts the formed contents into contents of a broadcast format based on the broadcast transmission conversion protocol, so that at least one user terminal device 300 located within a corresponding local area can execute the contents (step S202).

Further, the broadcast server 100 performs setting for transmitting the contents through a transmission path in a wired network (e.g. Internet) by applying a broadcast transmission protocol (step S204).

Then, the broadcast server 100 determines and sets an IP address of the wireless transmission apparatus 200 serving as an AP in a corresponding local area in the Internet protocol stack (step S206), and additionally determines a media access control address corresponding to the IP address of the wireless transmission apparatus 200 (step S208).

Thereafter, the broadcast server 100 transmits the contents to the media access control address through the physical stack connected with the wired network (e.g. Internet) (step S210).

Figure 5:
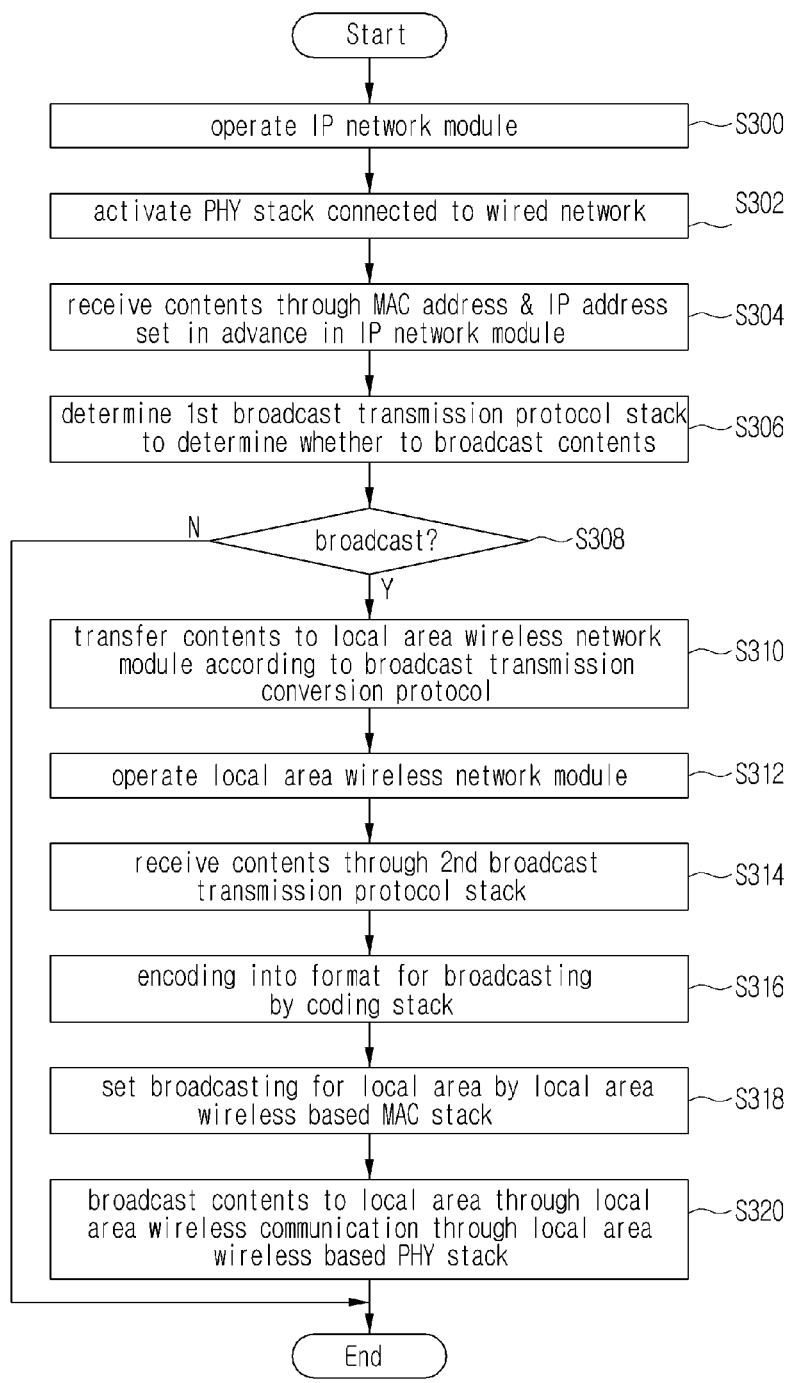
FIG. 5 is a flowchart illustrating the operation process of the wireless transmission apparatus 200 in the process shown in FIG. 3.

FIG. 5 is a flowchart illustrating the operation process of the wireless transmission apparatus 200 in the process shown in FIG. 3. As shown as a simple example in FIG. 5, the operation process of the wireless transmission apparatus 200 is initiated by execution of the operation of the IP network module 210 connected with a wired network (e.g. Internet) (step S300).

Then, the wireless transmission apparatus 200 activates the physical stack of the IP network module 210 to thereby receive contents through the IP address and the media access control address already set in the IP network module 210 (steps S302 and S304).

Then, the wireless transmission apparatus 200 determines whether to broadcast the contents by determining the first broadcast transmission protocol stack (e.g. UDP), and transfers the contents in the form of the broadcast transmission conversion protocol (e.g. MPEG2-TS) to the local area wireless network module 220 (steps S306 to S310).

Thereafter, the local area wireless network module 220 is operated (step S312).

The local area wireless network module 220 receives the contents through the second broadcast transmission protocol stack (e.g. UDP) (step S314).

Thereafter, the wireless transmission apparatus 200 encodes the contents according to a format for broadcasting the contents by applying a corresponding coding scheme through the coding stack (step S316).

Then, the wireless transmission apparatus 200 performs setting for broadcasting the contents to a local area through the local area communication based media access control stack (step S318).

Thereafter, the wireless transmission apparatus 200 broadcasts the contents to the local area through the local area communication based physical stack (step S320).

Figure 6:
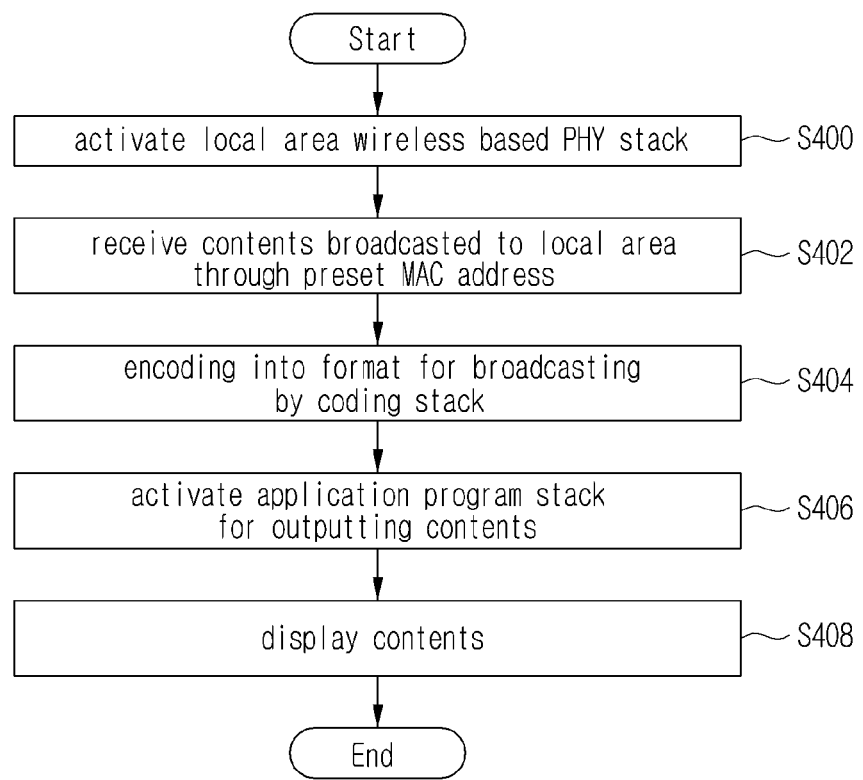
FIG. 6 is a flowchart illustrating the operation process of the user terminal device 300 in the process shown in FIG. 3.

FIG. 6 is a flowchart illustrating the operation process of the user terminal device 300 in the process shown in FIG. 3. As shown as a simple example in FIG. 6, the user terminal device 300 is located in a local area and activates the local area communication based physical stack to thereby prepare for reception of broadcasted contents (step S400).

Then, the user terminal device 300 receives the contents broadcasted to the local area through a preset media access control address (step S402).

The user terminal device 300 encodes the received contents according to the format for broadcasting the contents through the coding stack (step S404).

Thereafter, the user terminal device 300 activates an application program for outputting the contents and displays the contents (steps S406 and S408).

Hereinafter, the wireless transmission apparatus 200 and the user terminal device 300 for a local area communication method according to an embodiment of the present invention, and the local area communication method will be described in more detail.

Now, the construction of the wireless transmission apparatus 200 according to an embodiment of the present invention will be described in detail with reference to FIGS. 7 and 8.

Figure 7:
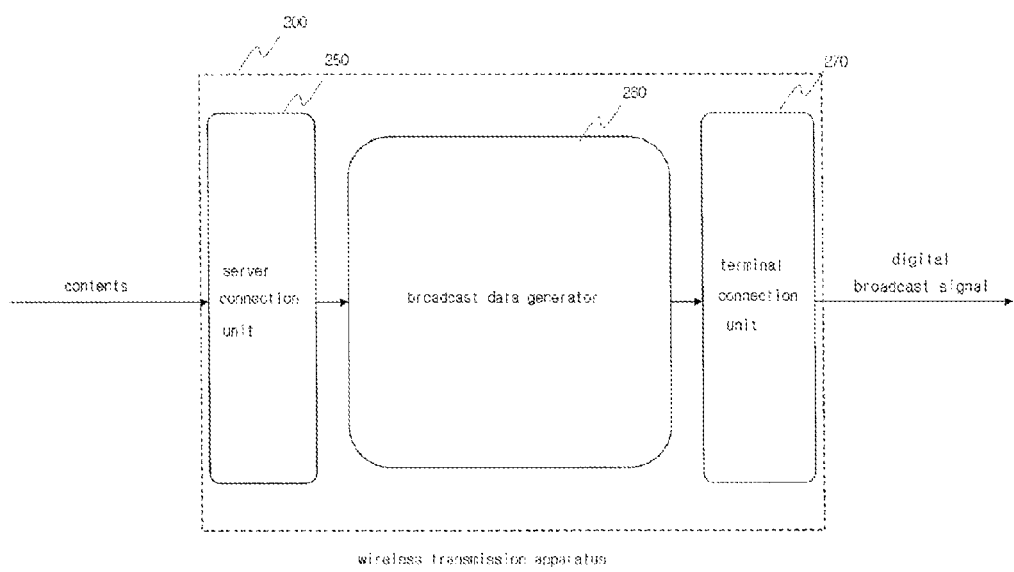
FIGS. 7 and 8 illustrate the construction of the wireless transmission apparatus according to an embodiment of the present invention.
Figure 8:
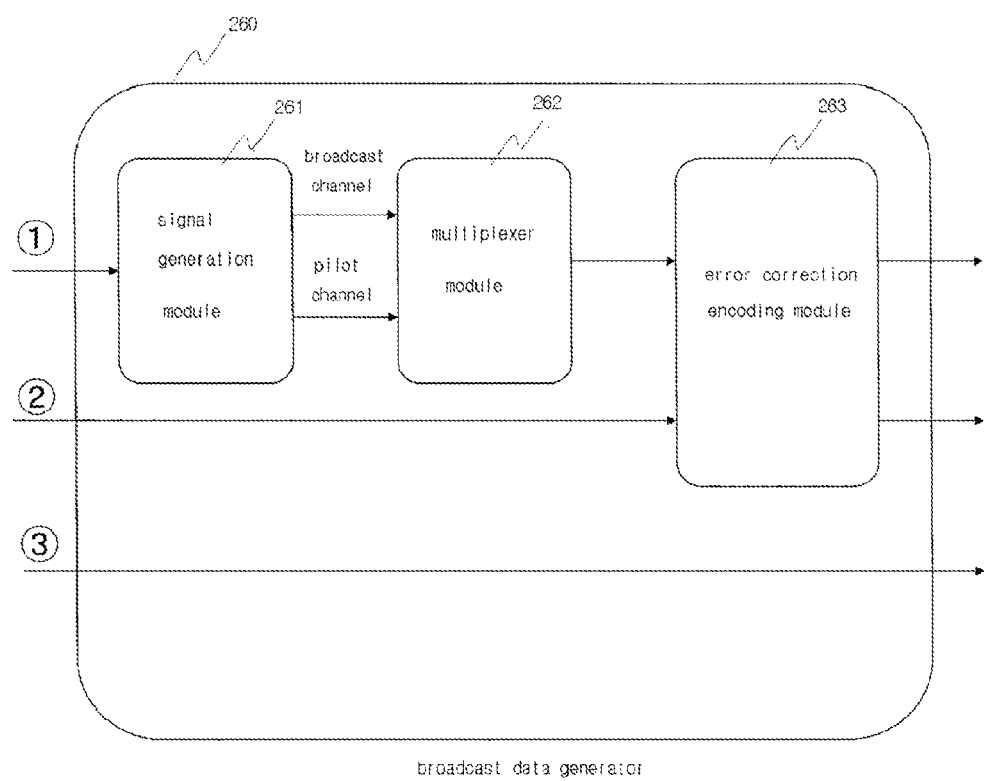

As shown in FIG. 7, the wireless transmission apparatus 200 includes a server connection unit 250 for forming a connection network with the wireless transmission apparatus 200; a broadcast data generator 260 for converting the contents to a digital broadcast signal; and a terminal connection unit 270 for broadcasting the digital broadcast signal.

Through the construction as described above, the wireless transmission apparatus 200 converts contents, which are received through a wired or wireless communication network from the remotely located wireless transmission apparatus 200, to a digital broadcast signal, which corresponds to unidirectional transmission type data, and broadcasts the converted digital broadcast signal to one or more adjacent user terminal devices through a local area communication network.

In more detail, the local area wireless network module 220 converts the contents received from the wireless transmission apparatus 200 through the server connection unit 250 to the digital broadcast signal. To this end, as shown in FIG. 8, the broadcast data generator 260 includes a signal generation module 261 for generating a pilot channel and a broadcast channel corresponding to the contents; a multiplexer module 262 for multiplexing the pilot channel and the broadcast channel; and an error correction encoding module 263 for performing a Forward Error Correction (FEC) of a signal output from the multiplexer module 262 to thereby output an encoded digital broadcast signal. When the contents correspond to multimedia data, such as a moving picture signal, the broadcast data generator 260 having the construction as described above generates a pilot channel and a broadcast channel corresponding to the contents, multiplexes the pilot channel and the broadcast channel, and performs an FEC of the multiplexed signal to thereby output an encoded digital broadcast signal (①). Meanwhile, when the contents correspond to simple data in the form of text or file, the broadcast data generator 260 performs only an FEC of the contents to thereby output encoded contents (②). In this event, when the capacity of the contents is relatively small in comparison with the reference capacity according to the user's setting, the FEC operation may also be omitted (③).

According to the type or size of the contents, the terminal connection unit 270 broadcasts the converted digital broadcast signal, the encoded contents having been subjected to only the FEC, or the pure contents, which are output from the broadcast data generator 260, to a plurality of adjacent user terminal devices 300 through a physical layer of the local area communication network.

As described above, the construction of the wireless transmission apparatus 200 according to an embodiment of the present invention enables broadcasting of data to a plurality of user terminal devices 300 located in a local area communication network through a broadcast type unidirectional transmission scheme instead of the existing connection based contents transmission scheme.

Hereinafter, the construction of the user terminal device 300 according an embodiment of the present invention will be discussed with reference to FIGS. 9 and 10.

Figure 9:
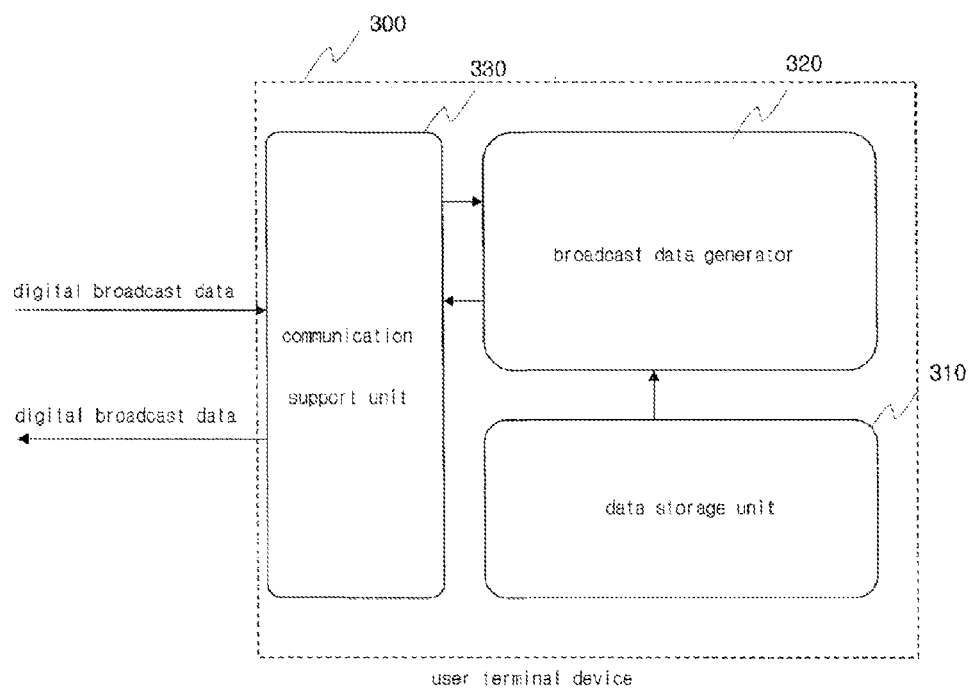
FIGS. 9 and 10 illustrate the construction of the user terminal device 300 according an embodiment of the present invention.

As shown in FIG. 9, the user terminal device 300 includes a data storage unit 310 for storing contents; a broadcast data generator 320 for converting the contents to a digital broadcast signal; and a communication support unit 330 for receiving the digital broadcast signal from an adjacent user terminal device and broadcasting the digital broadcast signal. Through the construction as described above, the user terminal device 300 converts previously stored contents to a digital broadcast signal, which corresponds to unidirectional transmission type data, and broadcasts the converted digital broadcast signal to one or more adjacent user terminal devices through a local area communication network.

Figure 10:
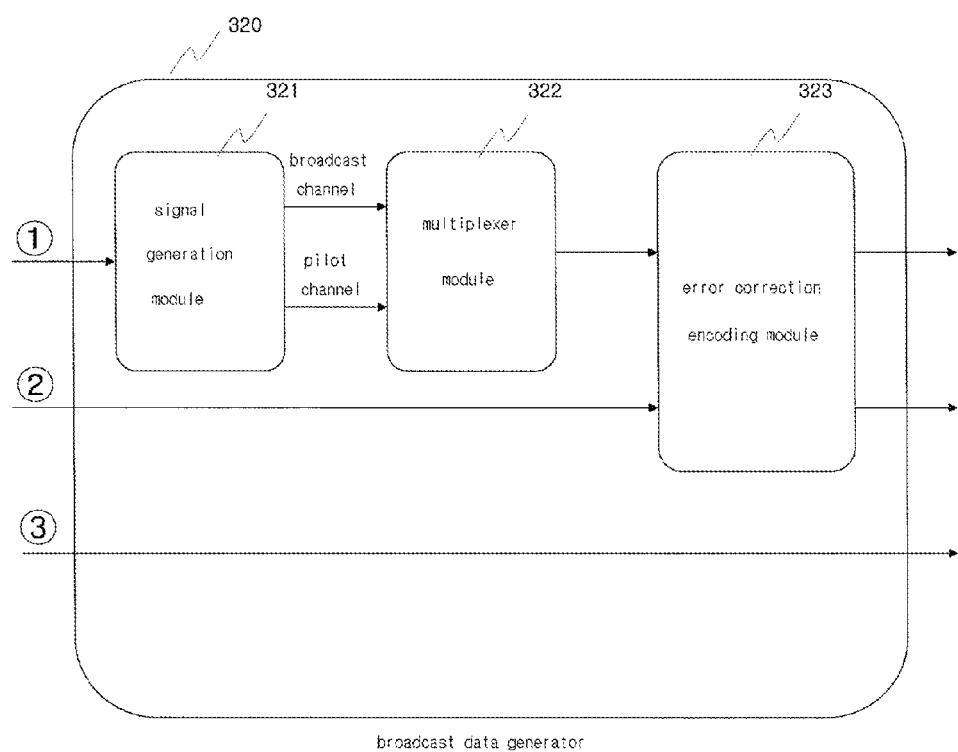

Specifically, as shown in FIG. 10, the broadcast data generator 320 includes a signal generation module 321 for generating a pilot channel and a broadcast channel corresponding to the contents; a multiplexer module 322 for multiplexing the pilot channel and the broadcast channel; and an error correction encoding module 323 for performing a Forward Error Correction (FEC) of a signal output from the multiplexer module 322 to thereby output an encoded digital broadcast signal. The broadcast data generator 320 has the same operation characteristics as those of the wireless transmission apparatus 200 shown in FIG. 3, so a more detailed description thereof will be omitted here.

According to the type or size of the contents, the communication support unit 330 broadcasts the converted digital broadcast signal, the encoded contents having been subjected to only the FEC, or the pure contents, which are output from the broadcast data generator 320, to a plurality of adjacent user terminal devices 300 through a physical layer of the local area communication network, and receives the digital broadcast signal from the adjacent user terminal devices 300 or the wireless transmission apparatus 200.

As described above, the construction of the user terminal device 300 according to an embodiment of the present invention enables reception of data broadcasted through a broadcast type unidirectional transmission scheme instead of the existing connection based contents transmission scheme, and enables broadcasting of data to other terminal devices adjacently located in the local area communication network.

Figure 11:
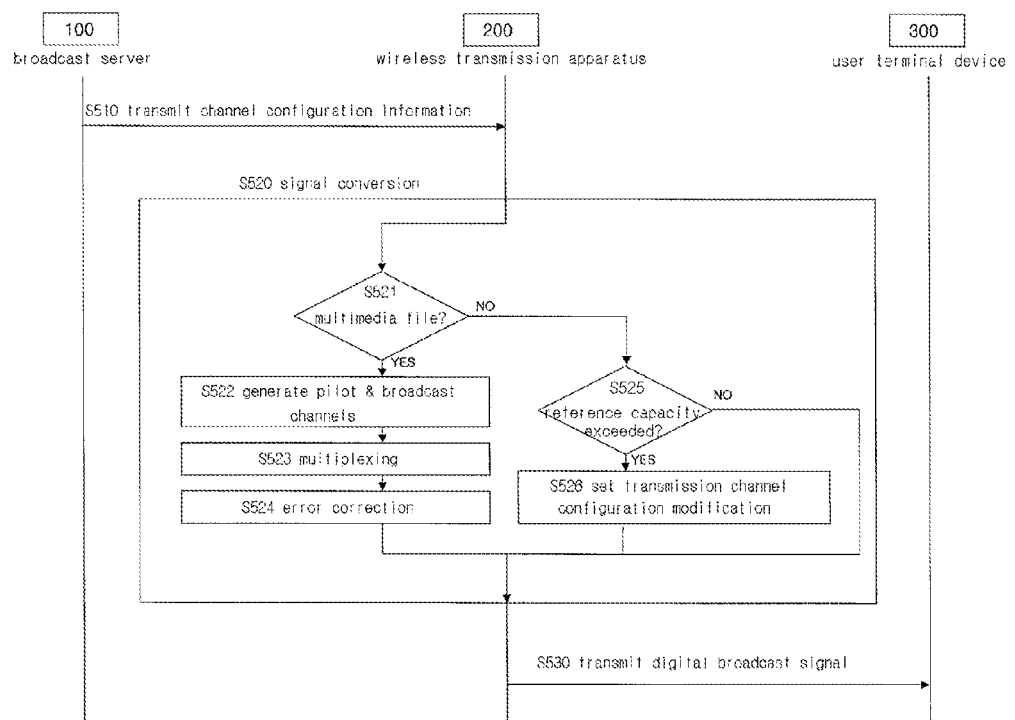
FIGS. 11 to 13 are flowcharts illustrating a method of providing a local area broadcast service according an embodiment of the present invention.
Figure 12:
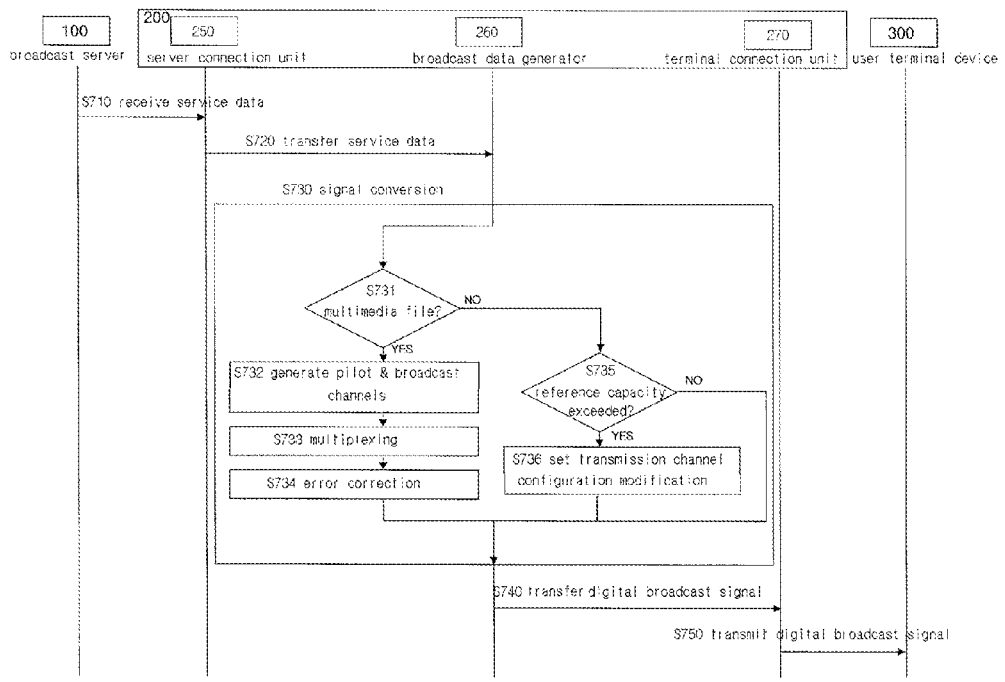
Figure 13:
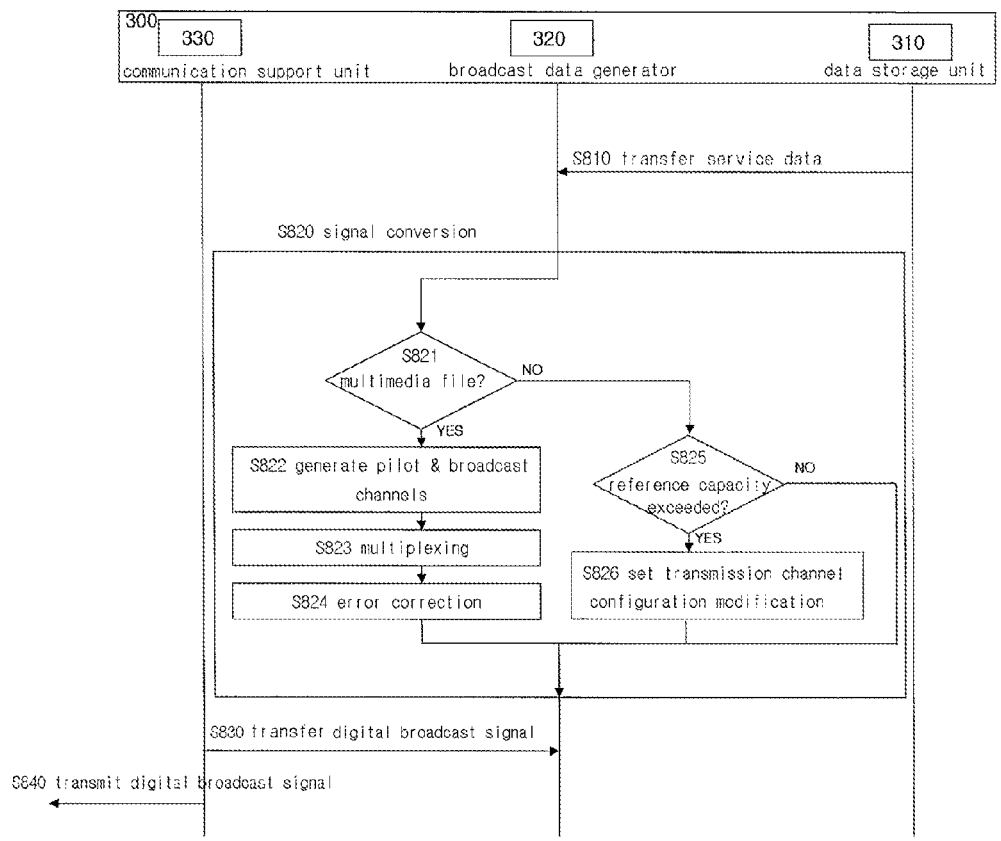

Hereinafter, a method of providing a local area broadcast service according to an embodiment of the present invention will be discussed with reference to FIGS. 11 to 13.

First, an operation of a local area broadcast service system according an embodiment of the present invention will be described with reference to FIG. 11.

First, the broadcast server 100 provides contents through a wired or wireless communication network (step S510). It is preferred that the contents provided by the broadcast server 100 include a text, a file, or a multimedia text, such as a moving picture.

Then, the wireless transmission apparatus 200 converts the contents received through the wired or wireless communication network to a digital broadcast signal, which corresponds to unidirectional transmission type data (step S520). Preferably, when the contents correspond to multimedia data such as a moving picture signal, the wireless transmission apparatus 200 generates a pilot channel and a broadcast channel corresponding to the contents (steps S521 and S522). In this event, the pilot channel includes configuration information relating to the contents and the broadcast channel includes multiple pieces of data information, such as a video signal and an audio signal, corresponding to the contents. Further, the wireless transmission apparatus 200 performs multiplexing of the pilot channel and the broadcast channel and then performs an FEC of the multiplexed signal, so as to output an encoded digital broadcast signal (steps S523 and S524). Meanwhile, when the contents correspond to simple data in the form of text or file, the wireless transmission apparatus 200 performs only the FEC of the contents, so as to output encoded contents (steps S525 and S526). In this event, when the capacity of the contents is relatively small in comparison with the reference capacity according to the user's setting, the FEC operation may also be omitted.

Thereafter, the wireless transmission apparatus 200 broadcasts the converted digital broadcast signal to one or more adjacent user terminal devices through a local area communication network (step S530). Preferably, the wireless transmission apparatus 200 broadcasts the converted digital broadcast signal, the encoded contents having been subjected to only the FEC, or the pure contents to a plurality of adjacent user terminal devices 300 through a physical layer of the local area communication network.

Then, the user terminal devices 300 adjacent to the wireless transmission apparatus 200 receive the digital broadcast signal broadcasted based on a unidirectional transmission scheme through the local area communication network.

In the operation of a local area broadcast service system according an embodiment of the present invention as described above, data is transmitted according to a broadcast type unidirectional transmission scheme instead of the existing connection based contents transmission scheme, so as to solve the problems due to the authentication process, the connection process, and the limit in the number of connections to be used for transmission.

Hereinafter, the operation of the wireless transmission apparatus 200 providing a local area broadcast service will be described with reference to FIG. 12.

First, the wireless transmission apparatus 200 receives contents from a remotely located broadcast server 100 (steps S710 and S720). Preferably, the broadcast data generator 260 receives the contents from the broadcast server 100 through the server connection unit 250.

Next, the wireless transmission apparatus 200 converts the contents received through a wired or wireless communication network to a digital broadcast signal corresponding to unidirectional transmission type data (step S730). Preferably, when the contents correspond to multimedia data such as a moving picture signal, the broadcast data generator 260 generates a pilot channel and a broadcast channel corresponding to the contents, through the signal generation module 261 (steps S731 and S732). In this event, the pilot channel includes configuration information relating to the contents and the broadcast channel includes multiple pieces of data information, such as a video signal and an audio signal, corresponding to the contents. Further, the broadcast data generator 260 performs multiplexing of the pilot channel and the broadcast channel and then performs an FEC of the multiplexed signal, so as to output an encoded digital broadcast signal (steps S733 and S734). Meanwhile, when the contents correspond to simple data in the form of text or file, the broadcast data generator 260 performs only the FEC of the contents through the error correction encoding module 263, so as to output encoded contents (steps S735 and S736). In this event, when the capacity of the contents is relatively small in comparison with the reference capacity according to the user's setting, the FEC operation may also be omitted.

Thereafter, the wireless transmission apparatus 200 broadcasts the converted digital broadcast signal to one or more adjacent user terminal devices through a local area communication network (steps S740 and S750). Preferably, the terminal connection unit 270 broadcasts the converted digital broadcast signal, the encoded contents having been subjected to only the FEC, or the pure contents, which are output from the broadcast data generator 260, to a plurality of adjacent user terminal devices 300 through a physical layer of the local area communication network.

In the operation of the wireless transmission apparatus 200 according an embodiment of the present invention as described above, it is possible to broadcast data to a plurality of user terminal devices 300 located in a local area communication network according to a broadcast type unidirectional transmission scheme instead of the existing connection based contents transmission scheme.

Finally, the operation method of a user terminal device 300 providing a local area broadcast service will be described with reference to FIG. 13.

First, the user terminal device 300 converts the contents already stored in the user terminal device 300 to a digital broadcast signal corresponding to unidirectional transmission type data (steps S810 and S820). Preferably, when the contents already stored in the data storage unit 310 correspond to multimedia data such as a moving picture signal, the broadcast data generator 320 generates a pilot channel and a broadcast channel corresponding to the contents, through the signal generation module 321 (steps S821 and S822). In this event, the pilot channel includes configuration information relating to the contents and the broadcast channel includes multiple pieces of data information, such as a video signal and an audio signal, corresponding to the contents. Further, the broadcast data generator 320 performs multiplexing of the pilot channel and the broadcast channel through the multiplexer module 322, and then performs an FEC of the multiplexed signal through the error correction encoding module 323, so as to output an encoded digital broadcast signal (steps S823 and S824). Meanwhile, when the contents correspond to simple data in the form of text or file, the broadcast data generator 320 performs only the FEC of the contents through the error correction encoding module 323, so as to output encoded contents (steps S825 and S826). In this event, when the capacity of the contents is relatively small in comparison with the reference capacity according to the user's setting, the FEC operation may also be omitted.

Thereafter, the user terminal device 300 broadcasts the converted digital broadcast signal to one or more adjacent user terminal devices through a local area communication network (steps S830 and S840). Preferably, the communication support unit 330 broadcasts the converted digital broadcast signal, the encoded contents having been subjected to only the FEC, or the pure contents, which are output from the broadcast data generator 320, to a plurality of adjacent user terminal devices 300 through a physical layer of the local area communication network.

In the operation of the user terminal device 300 according an embodiment of the present invention as described above, it is possible to receive data broadcasted based on a broadcast type unidirectional transmission scheme instead of the existing connection based contents transmission scheme, and broadcast data to a plurality of user terminal devices 300 located in a local area communication network according to the broadcast type unidirectional transmission scheme.

Although several exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention provides a protocol stack structure, in which contents to be broadcasted in a predetermined local area are transmitted from a broadcast server to a wireless transmission apparatus through a wired network based on an Internet Protocol and the contents are then broadcasted from the wireless transmission apparatus to one or more user terminal devices. Therefore, the present invention has a sufficient possibility that it can be sold in the market or be an object of business transaction. Further, it is clear that the present invention can be carried out. In conclusion, the present invention has a sufficient industrial applicability.

The invention claimed is:

1. A system having a protocol stack structure for providing a local area broadcast service, the system comprising:
a broadcast server configured to
form contents based on a broadcast transmission protocol and a broadcast transmission conversion protocol, and
transmit the formed contents via a wired network through a transmission protocol of the wired network; and
a wireless transmission apparatus configured to
convert the transmitted contents, which have been received via the wired network through the transmission protocol of the wired network, to a digital broadcast signal, and
broadcast the digital broadcast signal to a corresponding local area via local area wireless communication through the broadcast transmission conversion protocol,
wherein, when the transmitted contents correspond to multimedia data, the wireless transmission apparatus is configured to
generate a pilot channel and a broadcast channel corresponding to the transmitted contents,
multiplex the pilot channel and the broadcast channel to obtain a multiplexed signal,
perform a Forward Error Correction (FEC) of the multiplexed signal, and
provide the multiplexed signal after said FEC is performed as the digital broadcast signal, and
wherein, when the transmitted contents do not correspond to multimedia data, the wireless transmission apparatus is configured to perform the FEC of the transmitted contents and provide the contents after said FEC is performed as the digital broadcast signal.

2. The system as claimed in claim 1, wherein the broadcast server is configured to convert the contents to a carousel scheme through the broadcast transmission conversion protocol.

3. A method for providing a local area broadcast service in a broadcast server and a wireless transmission apparatus, the method comprising the steps of:
forming contents based on a broadcast transmission protocol and a broadcast transmission conversion protocol by the broadcast server;
transmitting the contents via a wired network through a transmission protocol of the wired network by the broadcast server;
executing an Internet Protocol (IP) network module by the wireless transmission apparatus which is connected with the wired network to receive the contents from the broadcast server;
generating, when the received contents correspond to multimedia data, a pilot channel and a broadcast channel corresponding to the received contents, multiplexing the pilot channel and the broadcast channel to obtain a multiplexed signal and performing an Forward Error Correction (FEC) of the multiplexed signal;
performing, when the received contents do not correspond to multimedia data, an FEC of the received contents; and
executing a local area wireless network module to broadcast the contents after said FEC is performed to a corresponding local area by the wireless transmission apparatus.

4. The method as claimed in claim 3, wherein the step of forming comprises:
forming the contents to be broadcasted by an application program stack of the broadcast server; and
setting the formed contents to be transmitted in accordance with a broadcast format by a broadcast transmission conversion protocol stack of the broadcast server.

5. The method as claimed in claim 3, wherein the step of transmitting comprises:
setting a transmission of the contents through a transmission path in the wired network by a broadcast transmission protocol stack of the broadcast server;
identifying an Internet Protocol (IP) address of an access point corresponding to a local area by an Internet Protocol (IP) stack;
identifying a Media Access Control (MAC) address of the access point based on the IP address by a MAC stack; and
transmitting the contents to the identified MAC address via the wired network by a physical stack in the broadcast server which is connected to the wired network.

6. The method as claimed in claim 3, wherein the step of executing the IP network module comprises the steps of:
executing a physical stack to connect with the wired network;
executing a media access control stack having a media access control address to be indicated as a destination of the contents from the wired network;
executing an Internet protocol stack having an IP address allocated to the media access control address corresponding to the local area; and
executing a first broadcast transmission protocol stack for determining to receive the contents.

7. The method as claimed in claim 6, wherein the step of executing the first broadcast transmission protocol stack determines to broadcast the contents, which are received based on a User Datagram Protocol (UDP), to the corresponding local area.

8. The method as claimed in claim 3, wherein the step of executing the local area wireless network module comprises the steps of:
executing a second broadcast transmission protocol stack for receiving contents in a form of the broadcast transmission conversion protocol from the IP network module;
encoding the contents according to a format for broadcasting the contents by a coding stack;
executing a local area communication based media access control stack for setting the local area as an object for broadcasting of the contents; and
executing a local area communication based physical stack for broadcasting the contents to the local area through a local area wireless communication.

9. A method for providing a local area broadcast service in a broadcast server having a protocol stack structure, the method comprising the steps of:
forming contents to be broadcast by an application program stack;
setting contents to be transmitted in accordance with a broadcast format by a broadcast transmission conversion protocol stack;
setting a transmission of the contents through a transmission path in a wired network by a broadcast transmission protocol stack;
identifying an Internet Protocol (IP) address of an access point corresponding to a local area by an Internet Protocol (IP) stack;

identifying a Media Access Control (MAC) address of the access point based on the IP address by a MAC stack; and transmitting the contents to the identified MAC address via the wired network by a physical stack which is connected to the wired network, wherein, when the formed contents correspond to multimedia data, a pilot channel and a broadcast channel corresponding to the contents are generated, multiplexing of the pilot channel and the broadcast channel to obtain a multiplexed signal is performed, and an Forward Error Correction (FEC) of the multiplexed signal is performed, and wherein, when the formed contents do not correspond to multimedia data, an FEC of the formed contents is performed.

10. The method of claim 9, further comprising:
transmitting the content in real time by a Real Time Protocol (RTP) stack.

11. The method of claim 9, wherein the broadcast transmission conversion protocol stack comprises a form of MPEG2-TS (Moving Pictures Experts Groups 2-Transport Stream).

12. The method of claim 9, wherein the transmission of the content is set based on a User Datagram Protocol (UDP).

13. A method for providing a local area broadcast service in a wireless transmission apparatus having a media access control address, the method comprising:

executing a physical stack to connect with a wired network;

executing a media access control stack having the media access control address to be indicated as a destination of the contents from the wired network;

executing an Internet protocol stack having an IP address allocated to the media access control address corresponding to a local area;

executing a first broadcast transmission protocol stack for determining to receive the contents;

executing a second broadcast transmission protocol stack to receive the contents in a form of the broadcast transmission conversion protocol from the first broadcast transmission protocol stack;

executing a coding stack to encode the received contents according to a format of the contents;

executing a local area communication based media access control stack to set the local area as an object for broadcasting of the contents; and executing a local area communication based physical stack to broadcast the encoded contents to the corresponding local area through a local area wireless communication, wherein, when the received contents correspond to multimedia data, the coding stack generates a pilot channel and a broadcast channel corresponding to the received contents, multiplexes the pilot channel and the broadcast channel to obtain a multiplexed signal, and performs an FEC of the multiplexed signal, and wherein, when the received contents do not correspond to multimedia data, the coding stack performs an FEC of the received contents.

14. The method of claim 13, wherein the first broadcast transmission protocol stack is set based on a User Datagram Protocol (UDP).

15. The method of claim 14, wherein the second broadcast transmission protocol stack is set based on a User Datagram Protocol (UDP).

16. The method of claim 13, wherein the coding stack is set based on a Protocol Adaptive Layer (PAL).

17. The method of claim 13, wherein the broadcast transmission conversion protocol comprises a form of MPEG2-TS (Moving Pictures Experts Groups 2-Transport Stream).

* * * * *